(12) United States Patent
Peeters et al.

(10) Patent No.: US 7,224,514 B2
(45) Date of Patent: May 29, 2007

(54) USING GAIN TILT FOR LOCAL COMPENSATION OF UNWANTED POWER GRADIENTS

(75) Inventors: Bram Peeters, Harlow (GB); Nigel L Bragg, Weston Colville (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 942 days.

(21) Appl. No.: 10/185,110

(22) Filed: Jun. 27, 2002

(65) Prior Publication Data

US 2004/0001710 A1 Jan. 1, 2004

(51) Int. Cl.
*H01S 3/00* (2006.01)
(52) U.S. Cl. ............... 359/337; 359/337.4; 359/337.1
(58) Field of Classification Search .......... 359/337, 359/337.4, 337.1
See application file for complete search history.

(56) References Cited

U.S. PATENT DOCUMENTS 5,818,629 A * 10/1998 Kinoshita ............ 359/337.11
6,275,313 B1   8/2001 Denkin et al.
6,359,726 B1 *  3/2002 Onaka et al. ............ 359/337.1
6,785,042 B1   8/2004 Onaka et al.
7,034,993 B2 *  4/2006 Kajiya et al. .......... 359/337.13

FOREIGN PATENT DOCUMENTS

DE    10040472    3/2002
JP    2001-007768  1/2001

* cited by examiner

*Primary Examiner*—Mark Hellner
(74) *Attorney, Agent, or Firm*—Barnes & Thornburg, LLP

(57) ABSTRACT

A compensator for optical transmission systems exploits gain tilt inherent in optical amplifiers. The amount of SRS induced spectral power gradient is determined, and the amplifier gain is changed to cause a compensating gain gradient in the optical amplifier to compensate for the SRS induced spectral power gradient. Fewer components are needed, and so it can be less expensive. It can be implemented as a simple software upgrade to existing systems. Many such compensators can be distributed through the system, without requiring a large inventory of individually specified filters. More accurate compensation can be achieved by making it dependent on the distribution of wavelengths within a band.

19 Claims, 8 Drawing Sheets

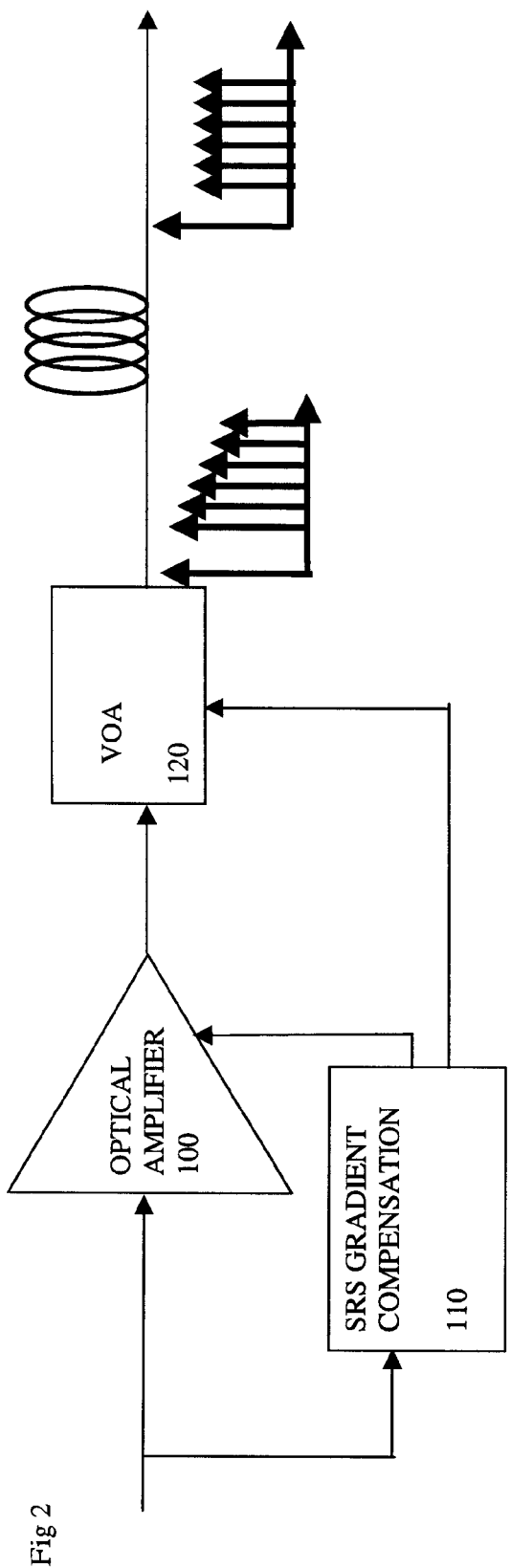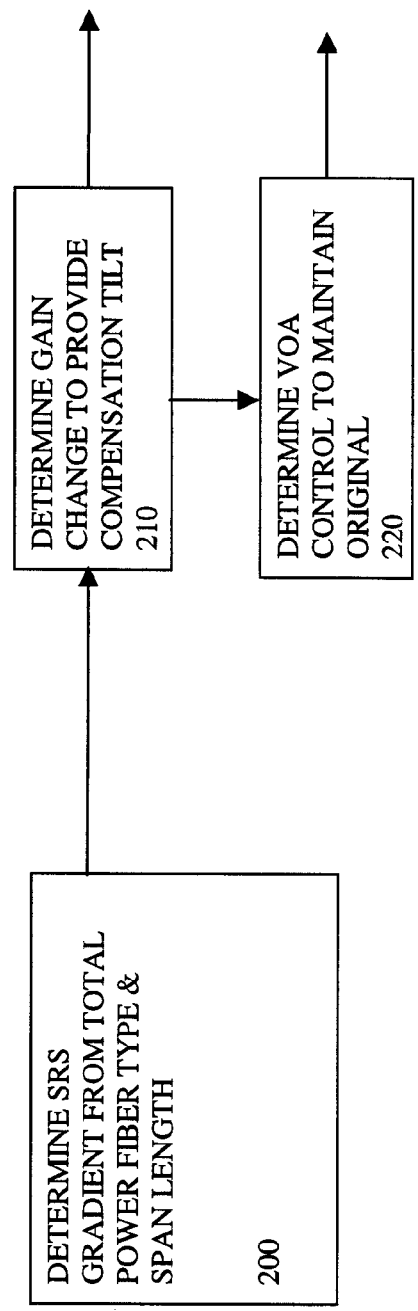
Fig 2
Fig 3  SRS GRADIENT COMPENSATION

USING GAIN TILT FOR LOCAL COMPENSATION OF UNWANTED POWER GRADIENTS

RELATED APPLICATIONS

This invention relates to co pending U.S. patent application entitled "Control of SRS induced transients" Nortel reference 15240ID, hereby incorporated in its entirety by reference.

FIELD OF THE INVENTION

This invention relates to compensators for unwanted power gradients such as SRS (Stimulated Raman Scattering) induced spectral power gradients in optical transmission systems, to optical amplifier systems having such compensators, to nodes for wavelength routed networks having such amplifier systems, to methods of compensating, to software for such apparatus and such methods, and to methods of offering a data transmission service over such networks.

BACKGROUND TO THE INVENTION

It is well known to try to equalize power levels across all channels in a WDM (wavelength division multiplexed) optical transmission system or network. Any variation in power levels can result in bit errors from distortions caused by non linearities if the power is too high. If the power is too low, bit errors can result from noise at the receiver. Providing a margin in the optical power budget to allow for variations, adds to system costs. It is also known to provide end to end dynamic gain equalization using variable optical attenuators or dynamic filters. Controlling optical amplifiers to reduce gain tilt inherent in the amplifiers is known from U.S. Pat. No. 5,818,629.

One type of non linearity, SRS (Stimulated Raman Scattering) which causes cross talk at high power levels, can also cause significant spectral power gradient (SPG) (that is variation of power with wavelength). This means that in optical transmission systems utilising WDM, short wavelength channels interact with long wavelength channels via Stimulated Raman Scattering (SRS). The effect of this is to increase the apparent span loss for short wavelength channels, and decrease it for long wavelength channels. The amount of this gradient varies with the total optical power of all the wavelengths. It is recognized in U.S. Pat. No. 6,275,313 that spectral distortion (in other words, SPG) introduced by stimulated Raman scattering (SRS) in an optical fiber transmission system is always linear on a dB/nm scale and depends solely on the total input power and not on the input power distribution. By maintaining the total input power to the fiber constant, the resulting gradient may be compensated for or canceled by using a fixed optical filter.

SUMMARY OF THE INVENTION

It is an object of the invention to provide improved apparatus and methods. According to a first embodiment of the present invention, there is provided a compensator for use in an optical path of an optical transmission system, the system having at least one optical amplifier, the amplifier having a gain tilt characteristic, the compensator being arranged to determine an amount of unwanted spectral power gradient in the optical path, determine an amount of gain to cause a gain gradient in the optical amplifier to compensate for the unwanted spectral power gradient, the compensator also having a controller arranged to control the optical amplifier according to the determined amount of gain.

This cleverly exploits a property of many optical amplifiers, particularly rare earth doped amplifiers, which up to now was seen as an unwanted side-effect, to be minimised and compensated out. Compared to the above referenced U.S. Pat. No. 6,275,313, fewer components are needed, and so it can be less expensive. Another advantage is easier implementation as an upgrade to an existing installed system, even as a simple software upgrade to existing systems, in many cases. The additional laser and filter used in the above referenced U.S. Pat. No. 6,275,313 will use additional power, which can be a constraint, particularly for high density systems. By dispensing with the need for the fixed filter, much greater flexibility can be obtained, since the fixed filter has to be specific to the fiber type and span length. Thus the invention makes it more practical to have many compensators in a system, without requiring a large inventory of individually specified filters. This in turn makes it easier to have compensation distributed through a network, rather than concentrated at a single point on each path. Particularly for wavelength routed networks, or even conventional networks with many OADMs (Optical Add Drop Multiplexers) it can be impractical to compensate at a single point, because of the many possible configurations of wavelengths.

In principle, there is no need for the detector to be co located with the controller or the amplifier. Also, the compensator can be arranged to compensate for the unwanted gradient induced in a preceding upstream span or spans, or to precompensate for that induced in a downstream span, or spans, or both upstream and downstream spans. The unwanted gradient can include SRS-induced gradient, and/or fiber attenuation gradients, or other effects which give a gradient of opposite sign to that of the amplifier gain tilt.

Another aspect provides an optical amplifier including such a compensator. Another aspect provides a transmission system (meaning a line or any kind of network) having many such compensators along a line. This enables the total unwanted gradient to be compensated in a distributed fashion. This can make it easier to design and reconfigure the network, since there is little or no need to account for the accumulation of unwanted gradient through the network, which could be extremely complex and hard to compensate in anything but the simplest of networks.

Preferred additional features set out below in dependent claims include the compensator being arranged to determine the SRS induced gradient from a total optical power level.

The number of wavelengths can be used to provide an estimate of the total power, but is not as good an indicator for the SRS-induced gradient as a measurement of the total power.

Another preferred additional feature involves the controller being arranged to determine the amount of gain according to how many wavelengths are present. This is a principal variable in determining the gain needed to achieve a desired tilt. It can be determined by detecting which wavelengths are present, indirectly from the total power and/or from information supplied externally, e.g. from a network management system.

Other such features include the controller being arranged to determine the amount of gain according to how the wavelengths present are distributed across a band. This is a further factor which can increase accuracy of compensation. Alternatively, the controller can be arranged to determine the amount of gain according to an average of two extreme gains, determined to give the correct compensating gradient for extreme distributions of wavelengths. This helps avoid the need to know the exact distribution of wavelengths or the power in each wavelength, and so enables a simpler compensator, at the expense of some accuracy. Such a simpler compensator can be implemented as a simple software upgrade to many types of amplifiers.

Another feature involves determining the amount of gain according to a power level of each of the wavelengths or groups of wavelengths. Again this can improve accuracy of compensation, since the relationship between gain setting and resulting tilt will depend on variations of power between wavelengths.

Another such feature involves adding a further gain tilt according to a length of fiber span, to compensate for fiber attenuation tilt. Similar advantages apply also to compensating for this type of tilt.

Further preferred additional features set out below in dependent claims include the compensator comprising a variable optical attenuator. This enables the overall gain to be maintained constant. In principle it can be located upstream or downstream of the amplifier. An alternative to a VOA, is to allow downstream amplifiers in the system to compensate automatically. This will only work if the subsequent amplifiers can be changed to give a flat gain at lower than design flat gain.

Another aspect of the invention provides a compensator for use in a wavelength multiplexed optical transmission system, compensator having:

a detector arranged to determine an amount of unwanted spectral power gradient, a dynamic filter having a controllable wavelength response, and a controller arranged to control the wavelength response of the dynamic filter to compensate for the unwanted spectral power gradient.

Other aspects of the invention include a corresponding method of compensating for SRS, a node for a wavelength routed network, software for implementing the compensator or for carrying out (which encompasses controlling) the method steps. This acknowledges that such software can be a valuable, separately tradable commodity. A compensator in the form of software is intended to encompass software which runs on or controls "dumb" or standard hardware, to carry out the desired functions, (and therefore the software essentially defines the functions of the compensator, and can therefore be termed a compensator, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Another aspect provides a method of offering a data transmission service over such a network having gradient compensation. As the advantages of the invention can enable a better network, which is more reliable or more flexible, or greater capacity, or more cost effective for example, consequently a data transmission service over the network can show a corresponding improvement, and the value of such services can increase. Such increased value over the life of the system, could prove far greater than the sales value of the equipment.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which:

FIG. 2 shows an amplifier system having a compensator according to another embodiment of the invention, FIG. 3 shows elements of SRS gradient compensation according to an embodiment of the invention.

DETAILED DESCRIPTION OF PREFERRED EMBODIMENTS

As mentioned above, when wavelengths are launched into fiber, power is transferred from the shorter wavelengths to the longer wavelengths, by SRS. This results in a deviation from the assumed power spectrum. The SRS-induced slope depends on the total signal power in the fiber, attenuation of the fiber, dispersion (a property of the fiber), and fiber type, and is independent of the actual distribution of wavelengths over the spectrum. The slope can give up to 4 dB deviation over 8 spans of fiber, or a gradient of 0.1 dB/100 GHz for a typical totally filled WDM system (1 dBm/channel). According to some of the embodiments described below, this is compensated or mitigated by using dynamic gain tilt (DGT, in dB/dB) as a counter-tilting mechanism. When changing the gain setting of the amplifier from its design flat gain, DGT will give the gain of the amplifier a slope. SRS is a deterministic phenomenon. The effect comes on top of all other statistical ripples and tilts in the system, and at each amplifier, the effect can be smaller than such other statistical ripples and tilt effects. The amounts of compensation can be correspondingly small. Nevertheless, by counteracting the deterministic effect of SRS with another deterministic affect, it is possible to prevent the small SRS gradients building up into a significant system problem as they propagate through the system.

Figure 1:
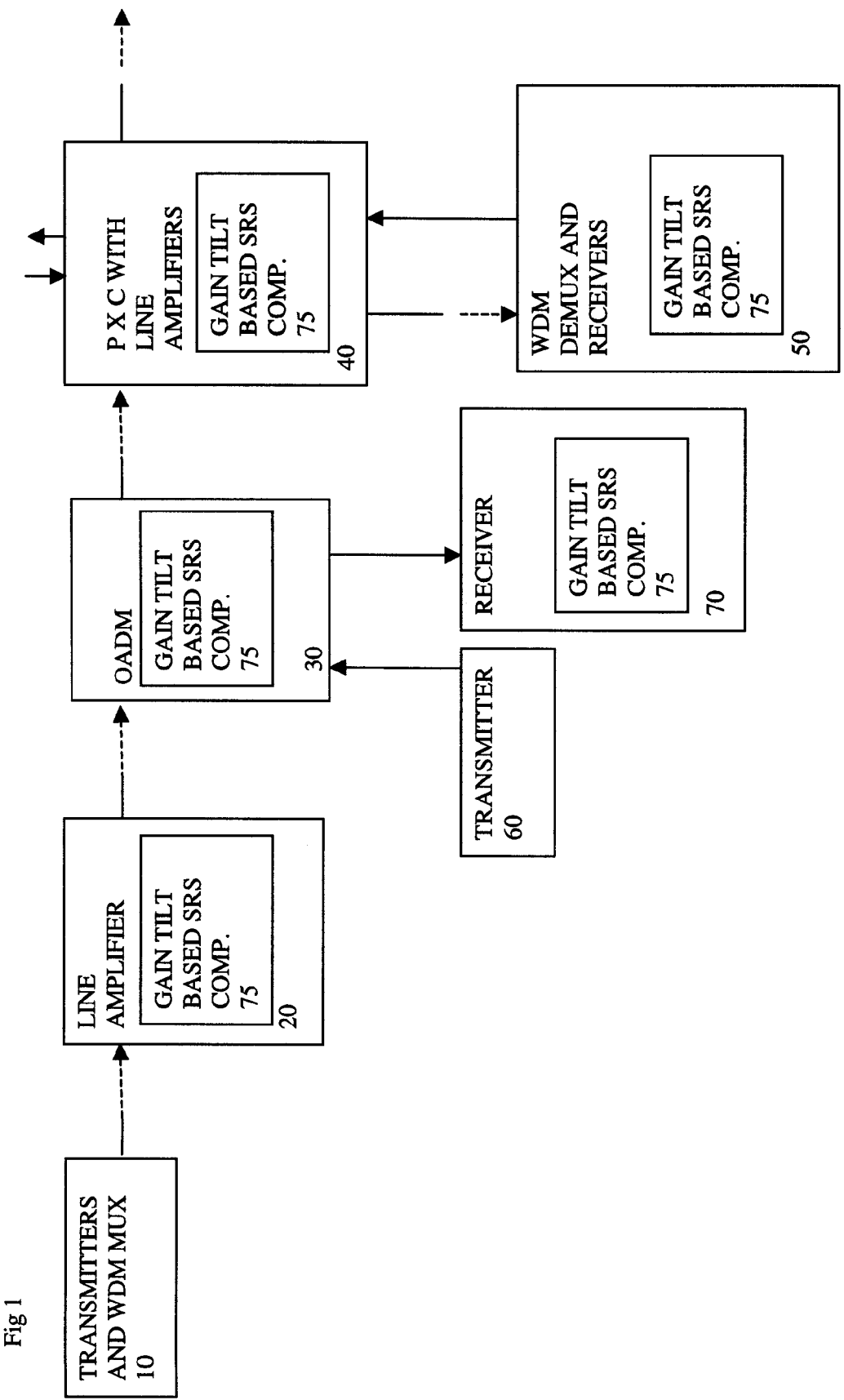
FIG. 1 shows an embodiment of the invention in the form of a network having SRS compensators.

FIG. 1, A Network Having SRS Compensators

FIG. 1 shows an embodiment of the invention in the form of an optical transmission network having SRS compensators. A typical network configuration is shown as an example, though the same principles can be applied to any configuration, including a point to point, ring, or mesh network for example. Transmitters 10 have WDM mux elements, and feed one or more transmission fibers coupled to a line amplifier 20. This can be implemented following established principles, except that it includes a gain tilt based SRS compensator 75. There may be many such line amplifiers, some or all of them having the compensator.

At any position along the optical path, there may be optical add drop modules (OADM). Again, such modules may include a gain tilt based SRS compensator 75. Such OADMs will serve to add or drop wavelengths for coupling to local users or local networks. A transmitter 60 is shown for a wavelength to be added. A receiver 70 is shown for a wavelength to be dropped. The receiver can include one of the gain tilt based SRS compensators 75. In principle, such a compensator could be included in any of the transmitters, to provide precompensation of a span. The OADM would typically incorporate a pre-amplifier and a post-amplifier, and the compensator could be incorporated in either of these amplifiers, or in other components of the OADM.

FIG. 1 also shows a photonic cross-connect (PXC) which again would include pre-amplifiers/post-amplifiers. A gain tilt based SRS compensator 75 can be incorporated in such a PXC, most conveniently in the amplifiers, but conceivably in other components of the PXC.

Receivers 50 are also illustrated. These would typically include WDM demultiplexers, followed by receivers for each individual channel. A pre-amplifier is typically Incorporated. As illustrated in the figure, a gain tilt based SRS compensator 75 is included. This may be incorporated in the amplifier, or in some other component at the receiver. This figure shows how such compensators can be distributed through a typical network. There is no need to have compensators at every amplifier.

FIG. 2: Amplifier Systems Having a Compensator

FIG. 2 shows an amplifier system having a compensator according to another embodiment of the invention. This may be used in the network of FIG. 1, or in other networks. An optical amplifier 100 is controlled by an SRS gradient compensation element 110. The output of the amplifier is fed to the next span of fiber via a VOA (Variable Optical Attenuator) 120. The amount of attenuation is controlled by the compensator 110. As shown in the figure there is a gradient of power with wavelength at the output of the VOA. By the end of the fiber span, the effect of this pre-compensating gradient balances the effect of SRS over the span, resulting in a flat profile of power with wavelength at the end of the span.

FIG. 3: Elements of SRS Gradient Compensation

FIG. 3 shows elements of SRS gradient compensation according to another embodiment of the invention. Element 200 determines the SRS gradient from the total power, the span length and the fiber type. Determination of span length and fiber type are not necessary, but will allow for an increasingly more accurate SRS gradient determination. This is fed to element 210 which determines gain change required to provide a compensating tilt. Element 220 controls the VOA to maintain the original level of power output. Each of these elements may be implemented in the form of software modules running on standard microprocessor hardware. The software modules can use any appropriate conventional software language, such as C for example.

For a typical amplifier, DGT varies linearly over the C-band from 1 at 1560 nm to a maximum of 2.5 dB/dB at 1530 nm. This can result in a 0.0375 dB/100 GHz gradient per dB gain change at 1560 nm.

To determine how much DGT to apply, the following considerations can be used. A change in gain gradient (dB/nm) is a function of the gain change. The gradient (dB/nm) changes as "the gain change at 1560 nm"×(DGT-1). For a typical amplifier this gives a 0.0375 dB/100 GHz gradient per dB gain change at 1560 nm, assuming a 2.5 dB/dB DGT. To compensate the gradient for the full system, assuming SRS induces a 3.7 dB gradient over the full band (4000 GHz) at full fill for a 32 wavelength system with 8 fiber spans (assume 16 amplifiers, then a gradient of 0.0058 dB/100 GHz per amplifier for 32 wavelengths present, gives 0.00018 dB/100 Ghz per amplifier per wavelength present.

Compensation requires the gain at 1560 nm on each amplifier to change with 0.0048 dB gain—per wavelength present in the system. For all 32 wavelengths present this results in a gain change per amplifier of 0.15 dB at 1560 nm, and a change of 0.38 dB per amplifier at 1530 nm. These values are much smaller than the statistical deviations that occur in normal operation, but the idea is to steer the statistics in a specific direction—as both SRS and DGT are deterministic properties.

Figure 4:
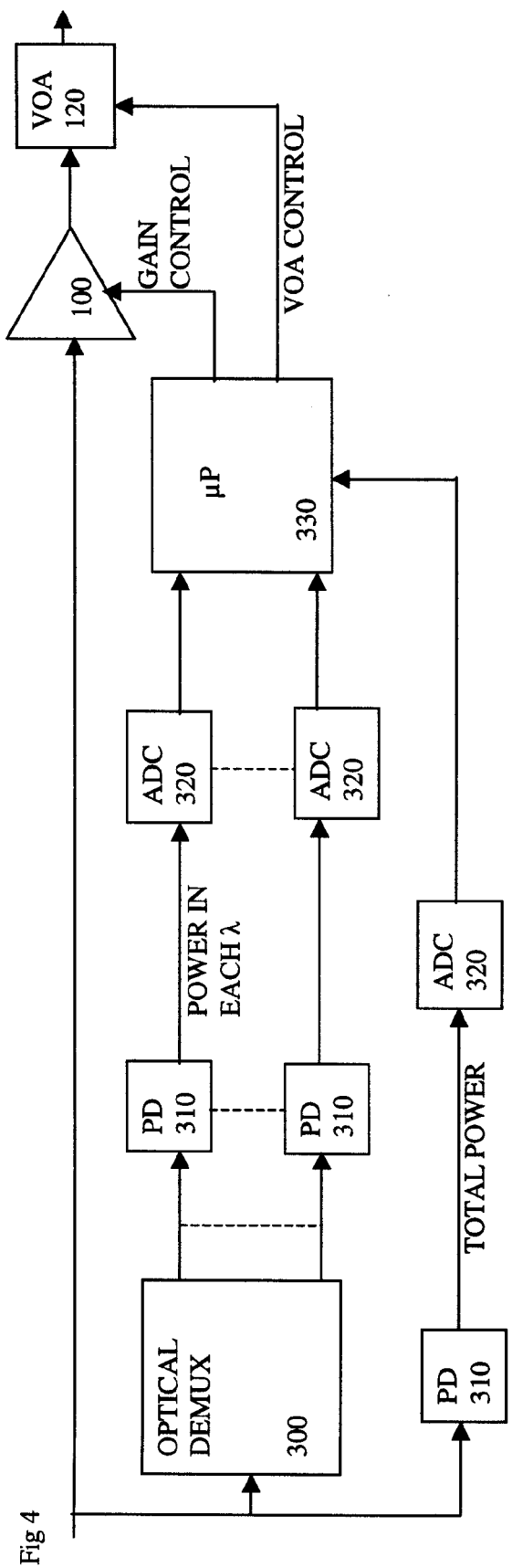
FIG. 4 shows one way of detecting power levels in each wavelength.

FIG. 4: Detecting Power Levels in Each Wavelength.

FIG. 4 shows one way of achieving a detection of the power level in each λ. Other ways are possible. An optical demultiplexer 300 feeds individual optical wavelengths to photodetectors (PD) 310. The output of these are each fed to analog to digital converters (ADC) 320. These each feed digital values to microprocessor 330. The microprocessor also receives a value for the total optical power in all the wavelengths, derived by a photodiode 310 coupled to the multiplexed optical signal. This photodiode feeds an analog to digital converter 320 which is coupled to the microprocessor. The microprocessor outputs a value to the optical amplifier 100 to control its gain. The microprocessor also controls the value of the VOA, to compensate for the gain changes made to the optical amplifier.

Other ways of determining the power in each wavelength include impressing at the start of a span, an amplitude modulation on each wavelength. The level of this amplitude modulation can be detected by a low frequency photodetector at the line amplifier. The detected level gives an indication of the power level of that wavelength. The power levels of different wavelength can be distinguished by applying a coding to the amplitude modulation, or by time multiplexing for example.

Figure 5:
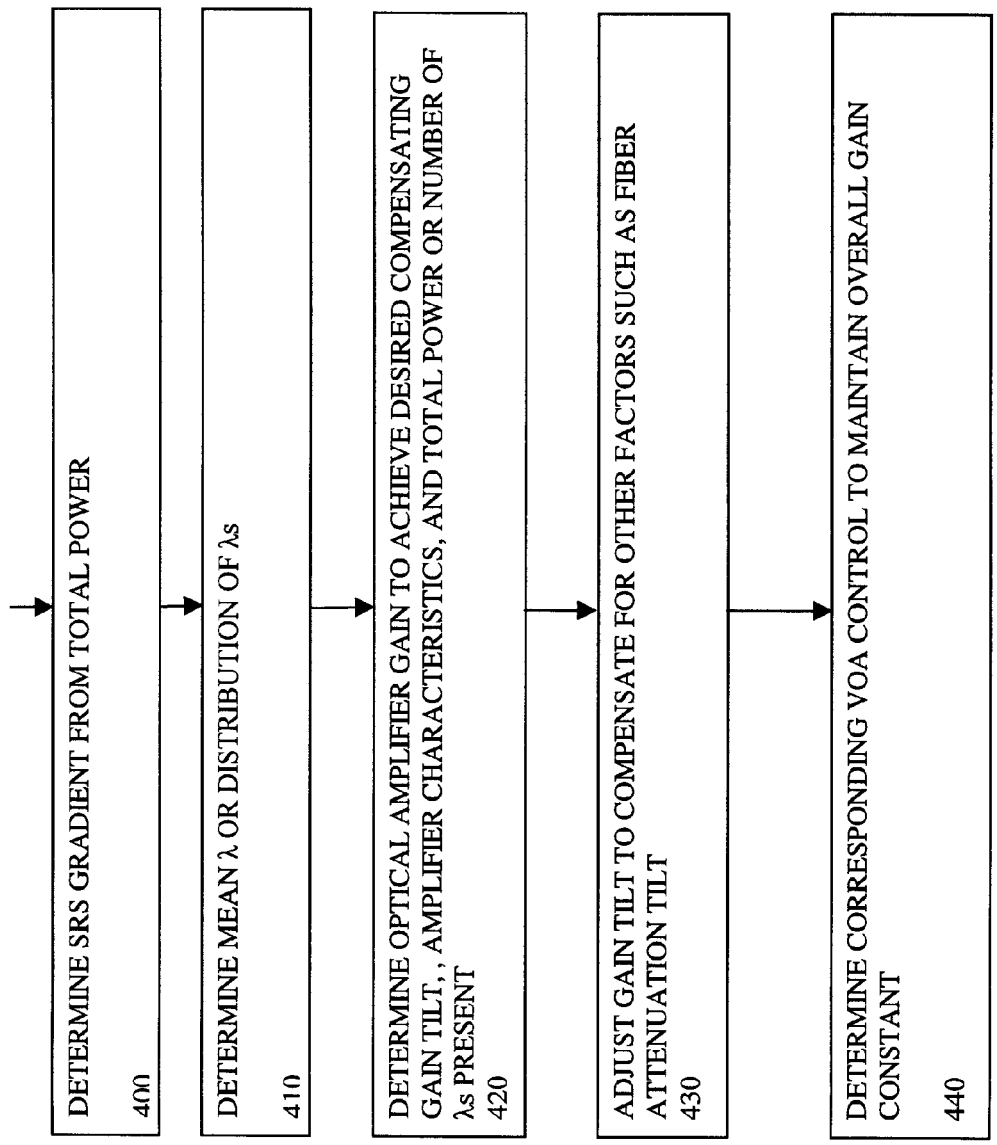
FIG. 5 shows steps for controlling a compensator according to another embodiment.

FIG. 5: Steps in Compensating for SRS Gradient

FIG. 5 shows steps involved in the compensation for SRS gradient. At step 400 the SRS gradient is determined from the total optical power. At step 410 a distribution of λs is determined. At step 420 a level of optical amplifier gain to achieve a desired compensating gain tilt is determined. This uses the values for distribution of λs, amplifier characteristics, and the total power, or the number of λs present. At step 430, the gain tilt is adjusted to compensate for other factors such as fiber attenuation tilt. At step 440, a level for controlling the VOA is determined, to compensate for the gain change in the amplifier, to maintain the overall gain constant.

Figure 6:
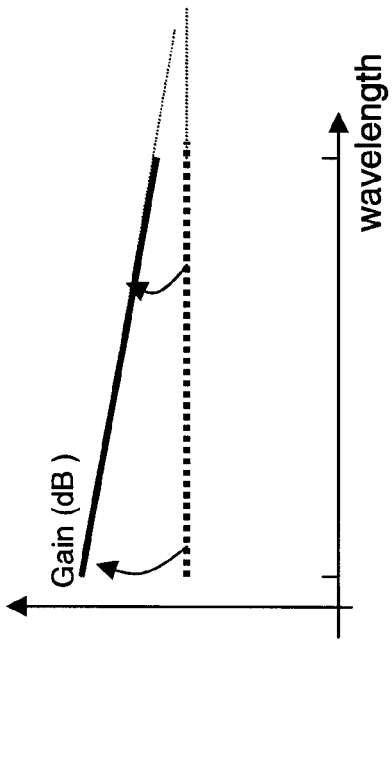
FIGS. 6, 7 and 8 show graphs illustrating the effects of SRS and DGT (dynamic gain tilt)
Figure 7:
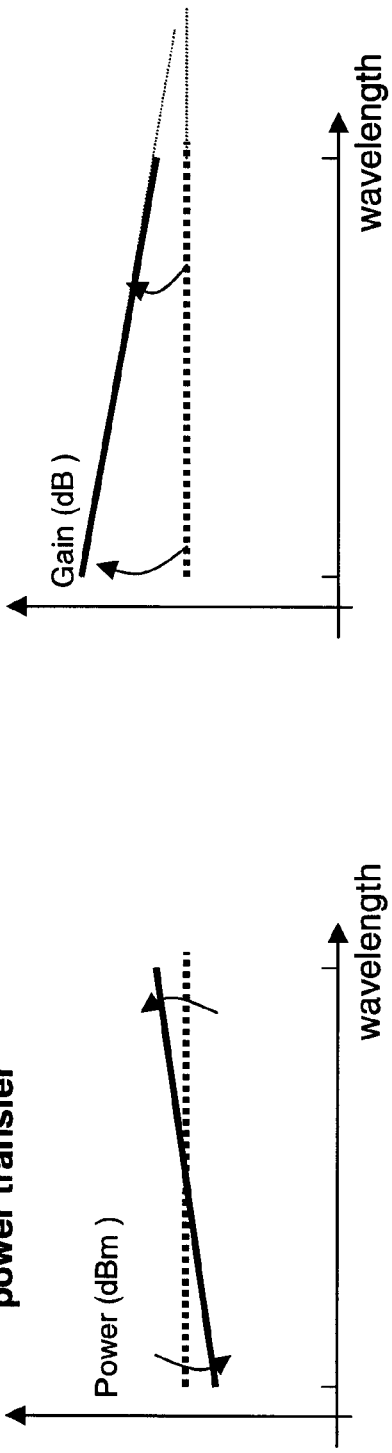
Figure 8:
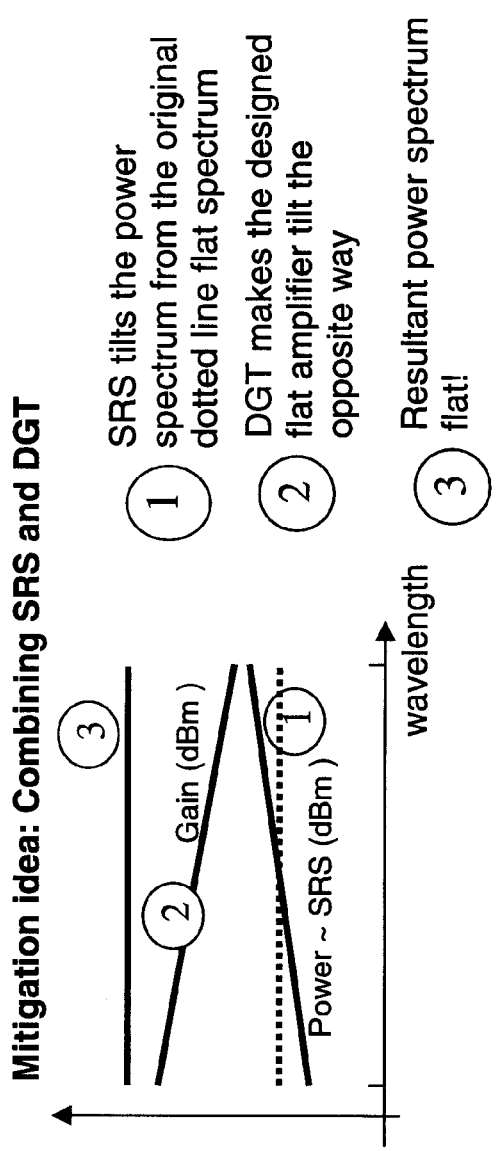

FIGS. 6, 7 and 8: Graphs Illustrating the Effects of SRS and DGT.

FIG. 6 shows a graph indicating the effect of SRS. Power in the optical signal is transferred from shorter wavelengths to longer wavelengths. The dotted line shows a profile of power versus wavelength before the signal is launched into a given span. At the end of the span, the profile tilts as shown by the solid line.

FIG. 7 shows the effect of DGT (Dynamic Gain Tilt). In this case, there is a bit in the opposite direction. Also, the pivot of the tilt is not in the centre of the wavelengths, and therefore there is an overall increase in gain, to achieve a given amount of tilt.

FIG. 8 shows a graph indicating how DGT can compensate for SRS. In item 1, the original flat gain shown by the dotted line is tilted by the SRS effect. Item 2 shows how a profile of gain resulting from DGT provides tilted amplification. Item 3 shows the resultant flat power spectrum. The overall gain has increased, therefore a compensating attenuation may be needed either at the compensator or downstream of the compensator.

Figure 10:
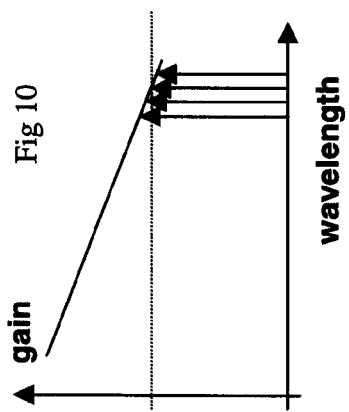
FIGS. 9 and 10 show graphs illustrating that for different extremes of distributions of wavelengths, the same gain setting gives different gain tilts.
Figure 9:
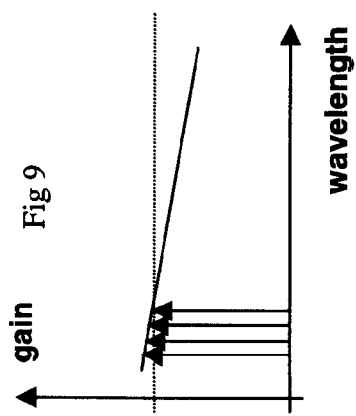

FIGS. 9 and 10: Graphs Illustrating Different Gain Tilts Given by Different Extremes of Distributions of Wavelengths For perfect cancellation, there would ideally be a constant and direct relationship between the amplifier gain gradient, and the gain setting of the amplifier. In practice, there are other variables in this relationship. Most notably, the gradient achieved for a specific gain setting varies with distribution of the wavelengths present. FIGS. 9 and 10 illustrate how the amount of tilt in order to achieve a certain level of gain in an amplifier, will vary depending on the distribution of the wavelength. Two extremes are shown. In FIG. 9, the wavelengths are concentrated at the short wavelength side of a band. In FIG. 10, the wavelengths are concentrated at a long wavelength end of the band. The effect is that the gain tilt in FIG. 10 is considerably greater than the gain tilt in FIG. 9, despite the wavelength having the same gain in both cases.

The compensating gradient is set by changing the amplifier gain, but for conventional optical amplifiers, only the total amplifier gain over all wavelengths can be controlled, not the gain at any specific wavelength. A perfect gain setting—to achieve an optimum compensating gradient setting—requires active knowledge about which wavelengths are present, and ideally prior knowledge about the spectrum of the amplifier or a different way of designing a gain-controlled amplifier. Even with an imperfect gain setting a significant compensation can be achieved.

The two extreme cases shown in FIGS. 9 and 10 are with all the wavelengths in the blue part of the spectrum (small gradient) or in the red part (large gradient). To get the same gradient for each case the gain has to be different (i.e. a higher total gain for the left case will result in the same gradient). One solution is to set the gain of the amplifier to the average of the two extreme gains that are needed to set a specific gradient for a specific number of wavelengths. More accurate but more complicated is to determine the actual distribution of the wavelengths present, and determine the best gain to achieve the desired compensating gradient. In practice this can be done by using a look up table. The task of determining the best gradient to minimise the peaks or troughs of gain, at the end of the span being compensated, is analogous to finding a best fit line, given a series of points. Various conventional algorithms can be applied, as would be apparent to those skilled in the art, to suit the accuracy required, and the processing resource limitations in each case.

Figure 11:
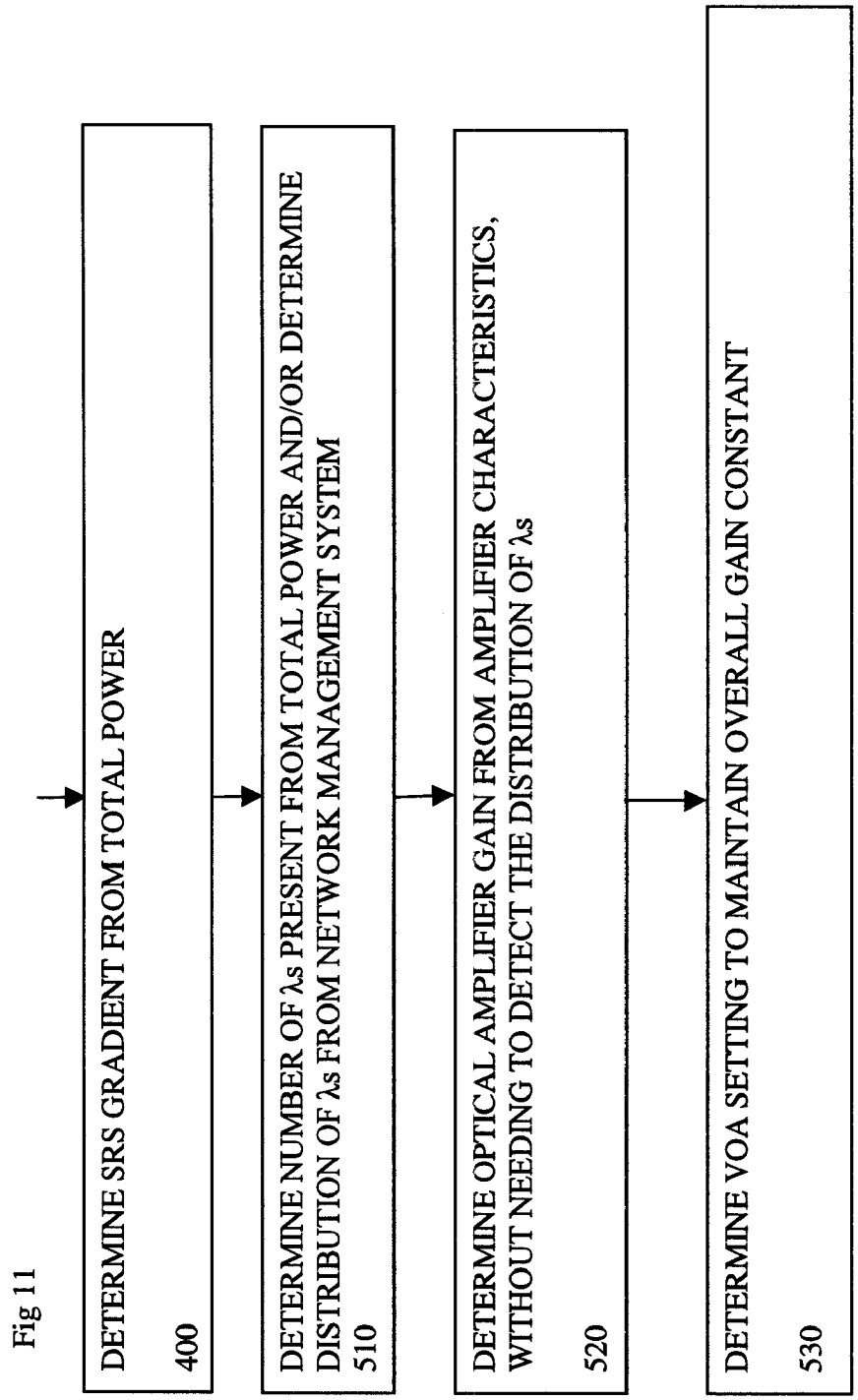
FIG. 11 shows steps for the compensator, according to another embodiment, not relying on knowing powers or distributions of wavelengths.

FIG. 11 Function of the Compensator, According to Another Embodiment

FIG. 11 shows steps in compensating according to another embodiment which is simplified by not needing to know the distribution of the wavelengths, or detect the power in each of the wavelengths. At step 400 the SRS gradient is determined from the total power. At step 510 the number of wavelengths is determined from the total power, or a distribution of wavelengths is indicated by the network management system, without needing to provide detection hardware. At step 520 the appropriate amplifier gain is determined from the simplified characteristics without needing to detect the distribution of $\lambda$s. This can be achieved by determining a gain for an average distribution of wavelengths. At step 530 the VOA setting is determined to maintain the overall gain constant.

Figure 12:
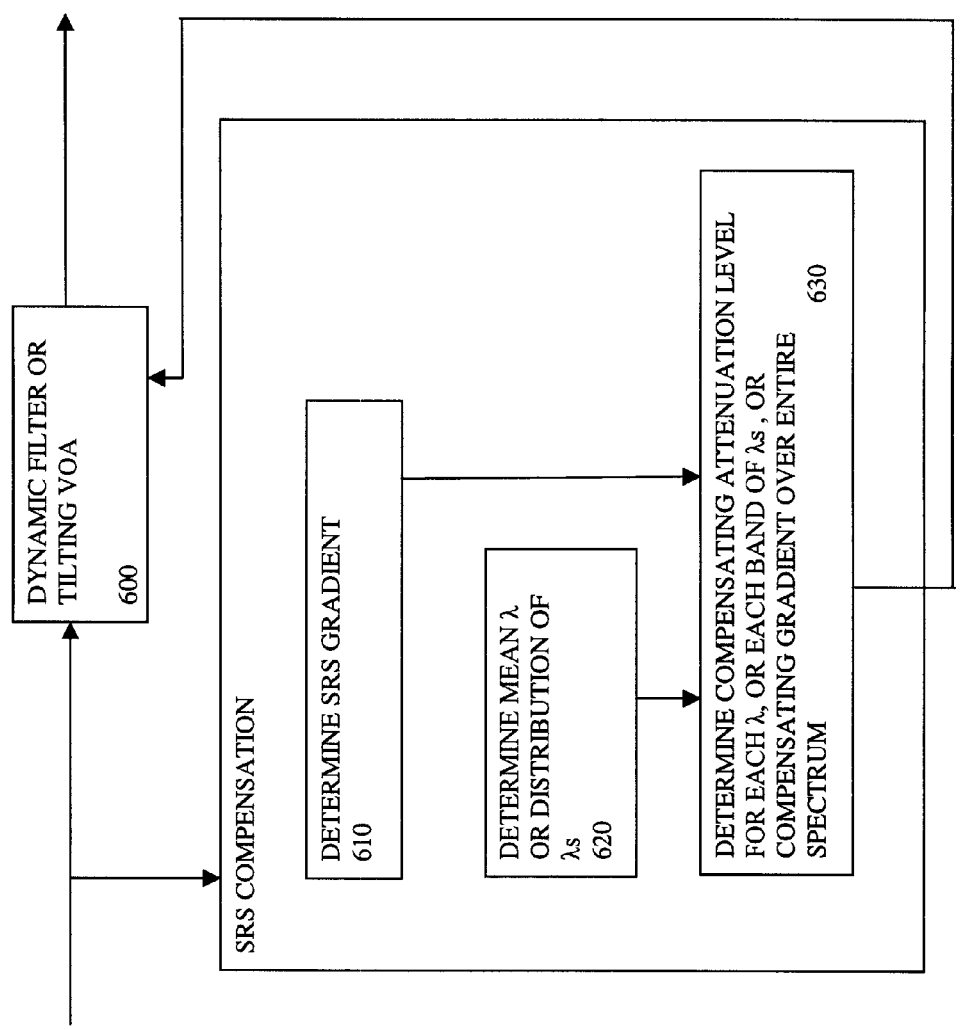
FIG. 12 shows an embodiment using a dynamic filter rather than an amplifier.

FIG. 12: An Embodiment Using a Dynamic Filter or VOA

FIG. 12 shows an embodiment using a dynamic filter or a tilting VOA, rather than an amplifier, to provide a compensating tilt. The compensation is determined by first determining the SRS gradient at element 610. At element 620 the mean $\lambda$ or distribution of $\lambda$s is determined. At 630 the compensating power level for each $\lambda$ or each band of $\lambda$s, or the compensating gradient over the entire spectrum is determined. The resulting output power control signal is used to control the dynamic filter or tilting VOA 600. The SRS gradient can be determined as before from the total optical power. As before, the mean $\lambda$ or distribution of $\lambda$s can be determined either by detection, or by an indication from the network management system. The compensation is often simpler to determine than is the case for examples using DGT, because there is no longer the variation of gain tilt for a given gain as shown in FIGS. 9 and 10. The precise calculation of the control signal will depend on the characteristics of the dynamic filter or tilting VOA.

Concluding Remarks

The counteraction in its simplest form depends on an assumed SRS-behaviour and an assumed DGT behaviour The actual behaviour depends on the attenuation, the dispersion, the actual fiber type and so on. Both DGT and SRS-gain are assumed to be linear functions, which is a reasonable first order assumption. For the compensation scheme a flat starting gain spectrum was assumed, though this is not essential, and compensation for non flat starting spectrum, and/or for other effects can be incorporated.

The counteraction always means increasing the gain. The actual flat gain can be defined a little below the gain that is really aimed for—so at full fill the combined power shaping of SRS and gain tilt will give a flat power spectrum at the desired gain. SRS is a fiber-dependent phenomenon—If only the amplifiers that launch into a fiber or those that have an input from a fiber are used to compensate, the amount of gain change can be doubled. A 0.01 dB change at 1560 nm per wavelength implies a 0.32 dB change for full system or a 0.8 dB change at 1530 nm. Depending on the erbium fiber type or the transmission band used in the amplifiers the DGT may be considerably smaller than 2.5—in the range of 2.2 dB/dB is possible. This means that some amplifiers will need a larger gain change to achieve the same gradient As has been described above, a compensator for optical transmission systems exploits gain tilt inherent in optical amplifiers. The amount of SRS induced spectral power gradient is determined, and the amplifier gain is changed to cause a compensating gain gradient in the optical amplifier to compensate for the SRS induced spectral power gradient. Fewer components are needed, and so it can be less expensive. It can be implemented as a simple software upgrade to existing systems. Many such compensators can be distributed through the system, without requiring a large inventory of individually specified filters. More accurate compensation can be achieved by making it dependent on the distribution of wavelengths within a band.

Other variations will be apparent to those skilled in the art, having corresponding advantages to those set out above, within the scope of the claims.

The invention claimed is:

1. A compensator for use in an optical path of an optical transmission system, the system having at least one optical amplifier, the amplifier having a gain tilt characteristic, the compensator being arranged to estimate an amount of unwanted spectral power gradient caused by one or both of SRS-induced spectral power gradient, and fiber attenuation tilt in the optical path, determine an amount of gain to cause a gain gradient in the optical amplifier to compensate for the unwanted spectral power gradient, the compensator also having a controller arranged to control the optical amplifier according to the determined amount of gain.

2. The compensator of claim 1, the compensator being arranged to determine the SRS-induced spectral power gradient from a total optical power level.

3. The compensator of claim 1, the controller being arranged to determine the amount of gain according to how many wavelengths are present.

4. The compensator of claim 1, the controller being arranged to determine the amount of gain according to how the wavelengths present are distributed across a band.

5. The compensator of claim 1, the controller being arranged to determine the amount of gain according to an average of two extreme gains, each determined to give a compensating gradient for extreme distributions of wavelengths.

6. The compensator of claim 1, the controller being arranged to determine the amount of gain according to a power level of each of the wavelengths or groups of wavelengths.

7. The compensator of claim 1, the compensator comprising a variable optical attenuator in the optical path and controlled by the controller.

8. Software on a computer readable medium for use as part of a compensator for use in an optical path of an optical transmission system, the system having at least one optical amplifier, the amplifier having a gain tilt characteristic, the software of the compensator being arranged to estimate an amount of unwanted spectral power gradient caused by one or both of SRS-induced spectral power gradient, and fiber attenuation tilt in the optical path, determine an amount of gain to cause a gain gradient in the optical amplifier to compensate for the unwanted spectral power gradient, the compensator also having a controller arranged to control the optical amplifier according to the determined amount of gain.

9. An optical amplifier for use in an optical path of an optical transmission system, the amplifier having a gain tilt characteristic, and having a compensator arranged to estimate an amount of unwanted spectral power gradient caused by one or both of SRS-induced spectral power gradient, and fiber attenuation tilt in the optical path, and to determine an amount of gain to cause a gain gradient in the optical amplifier to compensate for the unwanted power gradient, the compensator also having a controller arranged to control the optical amplifier according to the determined amount of gain.

10. The optical amplifier of claim 9, the controller being arranged to determine the amount of gain according to how the wavelengths present are distributed across a band.

11. The optical amplifier of claim 9, the controller being arranged to add a further gain tilt according to a length of fiber span, to compensate for fiber attenuation tilt.

12. The optical amplifier of claim 9, the compensator comprising a variable optical attenuator in the optical path and controlled by the controller.

13. A node for an optical transmission system, the node having more than one of the optical amplifiers of claim 9.

14. An optical transmission system having many of the optical amplifiers of claim 9 along an optical path, to provide distributed compensation.

15. A compensator for use in an optical transmission system, compensator having:
a detector arranged to detect optical power transmitted in the system and from that deduce an amount of unwanted spectral power gradient caused by one or both of SRS-induced spectral power gradient, and fiber attenuation tilt,
a dynamic filter having a controllable wavelength response, and
a controller arranged to control the wavelength response of the dynamic filter to compensate for the unwanted spectral power gradient.

16. The compensator of claim 15, the controller being arranged to add a further gain tilt according to a length of fiber span, to compensate for fiber attenuation tilt.

17. An optical transmission system having many of the compensators of claim 15 along an optical path, to provide distributed compensation.

18. A method of compensating for unwanted spectral power gradient in an optical transmission system having one or more optical amplifiers, the method having the steps of:
estimating an amount of unwanted spectral power gradient caused by one or both of SRS-induced spectral power gradient, and fiber attenuation tilt in the optical path,
determining an amount of gain to cause a gain gradient in the optical amplifier to compensate for the unwanted spectral power gradient, and
controlling the optical amplifier according to the determined amount of gain.

19. A method of offering a data transmission service over an optical transmission system having a compensator for use in an optical path of the optical transmission system, the system having at least one optical amplifier, the amplifier having a gain tilt characteristic, the compensator being arranged to estimate an amount of unwanted spectral power gradient caused by one or both of SRS-induced spectral power gradient, and fiber attenuation tilt in the optical path, determine an amount of gain to cause a gain gradient in the optical amplifier to compensate for the unwanted spectral power gradient, the compensator also having a controller arranged to control the optical amplifier according to the determined amount of gain.

* * * * *